Patented Aug. 8, 1950

2,518,193

UNITED STATES PATENT OFFICE 2,518,193

TITANATION OF POLYVINYL ALCOHOL

Frank Kerr Signaigo, Kenmore, N. Y., assignor to E. I. du Pont de Nemours & Company, Wilmington, Del., a corporation of Delaware No Drawing. Application August 22, 1946, Serial No. 692,382

3 Claims. (Cl. 260—91.3)

This invention relates to new chemical products and processes for obtaining such products, and more particularly to the production of improved modified hydroxyl-containing polymers including titanic acid esters of polymeric vinyl alcohols.

Polyvinyl alcohol is an important industrial polymer and, because of its high strength and other valuable properties, has numerous important industrial uses. Due to its solubility characteristics, especially in hot water, and its relatively high water-sensitivity, polyvinyl alcohol is, however, unsuitable for certain important commercial applications. Polyvinyl alcohol as commercially produced is usually soluble in water at room temperatures and fibers of such highly hydroxylated material, when not under tension, retract and are either soluble or lose strength, particularly in warm water.

It is among the objects of this invention to overcome the above and other disadvantages which characterize prior forms of polyvinyl alcohol and to promote and increase the usefulness thereof by advantageously modifying the properties of that product. Particular objects of the invention include the provision of a new class of highly-useful vinyl polymers, and particularly fibers of oriented, hydroxyl-containing materials exhibiting improved resistance to the deleterious effects of cold and hot water; of a novel process for obtaining such new and useful class of polymeric substances, together with novel methods for obtaining such products as well as shaped articles of polyvinyl titanate. Other objects and advantages of the invention will be evident from the following description thereof:

These objects are accomplished by bringing a polyvinyl alcohol into contact with solutions of certain soluble, tetravalent titanium salts under such conditions that a reaction therebetween will occur and a polyvinyl titanate will result.

In a more specific and preferred embodiment, the invention comprises treating a polyvinyl alcohol film or fiber with a solution of titanyl sulfate and effecting the treatment under suitable conditions until a desired degree of reaction has occurred and a polyvinyl titanate is produced.

In accordance with one adaptation of the invention, solid polyvinyl alcohol, in the form of oriented films, fibers or granules, is suitably treated with a solution of titanyl sulfate to form the desired titanic acid ester or titanate. Prior to treatment, the polyvinyl alcohol is preferably swollen or saturated by contacting it at room or elevated temperatures ranging from 80° C.–90° C., with water or other aqueous swelling media containing at least 5% of water, such as a mixture of water and alcohol. Thereafter, the swollen product is treated with an aqueous solution of titanyl sulfate to convert the same to an insolubilized product containing from about 1% to 25% of titanium by weight. The titanated product is then washed free from sulfate by treatment with water or alcohol, or by treatment at room or elevated temperatures with, preferably, dilute ammonium hydroxide or an alkali metal hydroxide or carbonate, such as those of sodium or potassium. The resulting titanium-modified product is transparent to visible light but opaque to ultraviolet light and even when containing as little as 1–2% of titanium, is completely insoluble in boiling water. The films containing titanium exhibit improved wet and dry strength in comparison with unmodified polyvinyl alcohol and greater dimensional stability. The insolubility of the polyvinyl ester of titanic acid resulting from the introduction of as little as 1% of titanium and the transparency of the films containing as much as 25% of titanium indicates the existence of a chemical combination in accordance with the reaction:

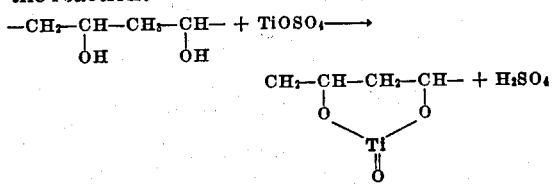

The fact that films and fibers of moderately high titanium content can be hot or cold drawn several hundred per cent indicates that there is not a high degree of cross-linking.

To a clearer understanding of the invention, the following specific examples thereof are given, none of which are to be construed as in limitation of the invention, since it will be apparent that many widely different embodiments can be resorted to without departing from the spirit and scope of the invention:

*Example I*

High viscosity polyvinyl alcohol films (3 mil thickness) were treated in water for 15–60 minutes at room temperature in order to swell the films and they were then soaked for 15 minutes and one hour, respectively, in 24.5% aqueous solutions of titanyl sulfate (TiO.SO$_4$.2H$_2$O) equivalent to 10% TiO$_2$ by weight. After the titanyl sulfate treatment the films were rinsed in ethyl alcohol, and then in 10% ammonia solution, followed by thorough washing with water, and drying. The modified films so prepared contained 18% and 22% of titanium, respectively, and were clear, transparent, and insoluble in boiling water. Films similarly treated without pre-swelling in water contained only 5%; 10%; and 12% of titanium after 15 minutes, 1 hour, and 16 hour treatments in titanyl sulfate, respectively. These latter films were nevertheless clear and transparent and insoluble in water. On the other hand, similar polyvinyl alcohol films, when treated identically as described above, except that the titanyl sulfate treatment was omitted, remained soluble in water, and other samples of film treated as above, except that sulfuric acid was substituted for titanyl sulfate, disintegrated immediately in water at 95° C.

Example II

Varying concentrations of titanium were introduced into polyvinyl alcohol films and fibers by varying the concentration of the titanyl sulfate solutions employed. For example, under the condition described in Example I above, pre-swelled polyvinyl alcohol films were soaked for 4 hours at room temperature in titanyl sulfate solutions containing $TiO_2$ equivalent to 0.1%, 1.0%, 5.0%, 7%, 10%, 15% and 20%. The films so treated, after washing in 3% ammonia and finally in water, contained, after drying, 2.4%, 5.4%, 11.5%, 13.2%, 21.0%, 24.7% and 20.5% titanium, respectively. The films so prepared were insoluble in boiling water, transparent, and colorless, and has a high degree of toughness and flexibility. The films can be plasticized with glycerol, and can be hot or cold drawn.

Example III

Glycerol plasticized polyvinyl alcohol films hot drawn 600% in mineral oil at 75° C., and treated as described above, except at temperatures of 60-70° C., while in the extended conditions were converted to insoluble films containing 3-10% of titanium, which contract only 10% in cold water, and about 25% in hot water (60° C.).

Example IV

Polyvinyl alcohol film having wet tensile strength of 400 to 1600 pounds per square inch was treated with titanyl sulfate, as described in Example I above, to produce clear, insoluble films containing about 4% by weight of titanium. After such treatment, the titanated films were found to have wet tensile strengths as high as 2800-3000 pounds per square inch.

The dry tensile strength of these films was increased from 5000-13,000 pounds per square inch at 50% relative humidity to as high as 40,000-50,000 pounds per square inch by titanyl sulfate treatment, as described in Example I, followed by hot drawing 500-600% at 75-100° C.

Example V

High viscosity polyvinyl alcohol film similar to that employed in Example I above was swelled and softened by soaking in water at room temperature for an hour and transferred without drying to a 20% aqueous solution of titanium lactate and allowed to soak in this solution for several hours, after which it was washed in 3% ammonia solution, and finally in water, and dried. The resulting product consisted of a colorless, tough, transparent film which was insoluble in water even after boiling for 24 hours, contained 6% by weight of titanium, and had increased capacity to U. V. light.

Example VI

Basic titanium monoacetate was prepared by adding titanium tetrachloride to an alcoholic suspension of potassium acetate, filtering off the precipitated potassium chloride, and evaporating the alcoholic solution of basic titanium monoacetate to dryness in vacuo. The freshly-prepared basic titanium monoacetate was dissolved in water to form a 20% solution and used immediately for the titanation of polyvinyl alcohol films.

Polyvinyl alcohol film, similar to that used in Example I above, was preswelled and softened by soaking in water, and then soaked for an hour in the 20% basic titanium monoacetate solution after which it was washed for 15 minutes in a 3% solution of ammonia, and finally washed thoroughly with water and dried at 70° C.

The resulting product consisted of a colorless, tough, transparent film, insoluble in boiling water, and contained approximately 10% by weight of titanium.

Example VII

Glyceryl titanate was prepared by dissolving one mole of freshly-precipitated titanium hydroxide in four moles of anhydrous glycerol containing a small proportion of sodium carbonate at 200° C. in an inert atmosphere. Heating was continued until all water was removed and a clear solution was obtained. This solution, on cooling, was diluted with water, and alcohol was added to precipitate the glyceryl titanate, which was then separated by filtration, washed with anhydrous alcohol, and dried. The resulting dry glyceryl titanate was dissolved in water to form a 20% solution and used for the treatment of polyvinyl alcohol films.

Polyvinyl alcohol film previously swelled and softened in water was soaked for one hour in a 20% solution of glyceryl titanate, and washed thoroughly with water, and dried at 70° C. The dried film was colorless and transparent, and insoluble in boiling water.

Example VIII

A 98 denier/60 filament yarn of polyvinyl alcohol with a tenacity at 25° C. and 60% relative humidity of 7.0 g./d. at 4.2% elongation was made into a skein which was relaxed by immersing in water at 30° C. for 5 minutes. This treatment caused the yarn to shrink to 70% of its original length. The relaxed yarn was wound on a package with the ends secured to prevent shrinkage and then treated under the following conditions:

(a) exposure to water at 80° C. for 10 minutes,
(b) exposure to solution containing 32 parts of titanyl sulfate and 68 parts of water at 67° C. for 30 minutes,
(c) a ten second rinse in 95% ethyl alcohol,
(d) exposure for 30 minutes to an aqueous solution containing 7% ammonia at 30° C.,
(e) exposure to 30° C. water for 30 minutes, and
(f) exposure for 10 minutes to boiling water.

The polyvinyl alcohol yarn given this treatment had a tenacity at 25° C. and 60% relative humidity of 2.74 g./d. at 15.1% elongation and a wet tenacity at 25° C. of 2.15 g./d. at 19% elongation. The treated yarn shrank only 2% on immersion for 4 minutes in boiling water, whereas the original yarn dissolved in water at 75° C.

As already noted, the invention is applicable to solid polyvinyl alcohol in the form of films, fibers, granules, and powders. The extent of esterification may be varied depending on the particular properties desired. For example, if it is only desired to render a polyvinyl alcohol film insoluble in boiling water, it is only necessary to subject it to a relatively mild treatment with a titanating agent such as titanyl sulfate. On the other hand, when it is desired to obtain a product of minimum water sensitivity (moisture absorption), and maximum dimensional stability, it is desirable to employ somewhat more drastic treatments to induce a higher degree of esterification. It is apparent that the degree of esterification can be controlled by the proportion of reactants employed, the time and temperature of treatment, and the concentration of reagents.

The titanation process generally can be carried out at room temperature (about 20–25° C.) or within a range of from 55° C. to 80° C. If desired, higher temperatures within the stability limits of the titanium compound solutions and below the point at which the titanium compound may hydrolyze also may be employed and may advantageously increase the rate of reaction. In some cases, particularly with fibers, the titanation treatment may be carried out continuously. The time period is usually relatively short and may range from about 5–15 minutes or longer depending upon the temperatures and concentrations used, as well as the extent of titanation desired.

In reacting the polyvinyl alcohol starting material in film, fiber, or granular form with an appropriate titanium compound, it is desirable that the material be preswelled by advance treatment (at temperatures ranging from 0° C. to 100° C.) in water, or that the titanating agent be dissolved in a solvent that will swell the film or fiber. The preferred solvent is water, although, as noted above, a mixture of water and a lower alcohol may be used.

Although titanyl sulfate has been indicated above as the preferred titanating agent, other chlorine-free, inorganic or organic, water-soluble tetravalent titanium salts, such as titanium sulfate, titanium nitrate, titanium lactate, titanium acetate, titanium oxalate, titanium hydroxyacetate and glyceryl titanate, etc., may be employed. Chlorine-containing titanium compounds, such as titanium tetrachloride, are non-useful in the invention because of the undesirable drastic effect which they exert on the polyvinyl alcohol. Thus, films treated with such compounds become degraded and disintegrate after treatment, are tender while wet and excessively brittle when dry, and are non-transparent. If desired, the agents contemplated for use herein may be used in combinations with compounds, such as sodium bisulfide, mercaptans and organic disulfides, which serve to stabilize the polyvinyl titanate articles to light.

The amount or concentration of $TiO_2$ present in the treating solution used is variable but should be sufficient to afford titanation of the polyvinyl alcohol to the extent of at least 1% of titanium by weight, with amounts up to 25% being usually sufficient for all practical purposes. This is readily accomplished by employing solutions having a titanium content, as $TiO_2$, ranging from about 10–18%. Where the $TiO_2$ concentration is relatively low, sufficient $H_2SO_4$ should be present in the solution to prevent $TiO_2$ precipitation.

The polyvinyl esters of titanic acid of this invention, as already stated, constitute a new class of vinyl polymers having a number of uses. They may be obtained as strong, pliable films or fibers of extremely low water-sensitivity, capable of being oriented to develop very high tensile strengths, and dimensional stability. Although transparent to visible light, titanated films of polyvinyl alcohol containing as little as 1.5% of titanium are opaque to U. V. light below 4000 A. U. As dispersions, these materials have applications in the field of adhesives and emulsifying agents. Another feature of the invention is that it provides a simple means of modifying the properties of preformed polyvinyl alcohol articles.

I claim as my invention:

1. A method for titanating and insolubilizing polyvinyl alcohol film which, after treatment, is transparent to visible light and insoluble in boiling water which comprises swelling said film by contacting the same with an aqueous medium, and then subjecting the preswelled film to reaction with a solution of a water-soluble, chlorine-free titanium compound having a $TiO_2$ concentration and for such period of time that said alcohol becomes titanated to the extent of at least 1% by weight of titanium.

2. A method for titanating and insolubilizing polyvinyl alcohol film which, after treatment, is transparent to visible light and insoluble in boiling water which comprises swelling said film by contacting the same with an aqueous medium, and then subjecting the preswelled film to reaction with an aqueous solution of titanyl sulfate having a $TiO_2$ concentration and for such period of time that said alcohol becomes titanated to the extent of at least 1% by weight of titanium.

3. A method for modifying solid polyvinyl alcohol film which, after modification, is transparent to visible light and insoluble in boiling aqueous media, comprising initially saturating said alcohol film with water to effect the swelling thereof, reacting the resulting product with sufficient titanyl sulfate in aqueous solution and having a 10–18% $TiO_2$ concentration to incorporate therein from about 1% to 25% by weight of titanium, and then neutralizing and recovering the titanated product.

FRANK KERR SIGNAIGO.

REFERENCES CITED

The following references are of record in the file of this patent:

UNITED STATES PATENTS

| Number | Name | Date |
|---|---|---|
| 2,310,223 | Eaton | Feb. 9, 1943 |
| 2,334,358 | Smith | Nov. 16, 1943 |
| 2,360,479 | Detrick et al. | Oct. 17, 1944 |

OTHER REFERENCES

Elod et al., Stiasny Festchr (1937), pp. 41–52 as reported in British Chemical Abstracts B (1938), page 303 and vol. 32 Chem. Abstr. Column 7763.